US011408845B2

United States Patent
Zhu et al.

(10) Patent No.: US 11,408,845 B2
(45) Date of Patent: Aug. 9, 2022

(54) PASSIVE WIRELESS SENSOR FOR DETECTING DISCRETE DROPLETS AND BUBBLES

(71) Applicant: Southeast University, Jiangsu (CN)

(72) Inventors: Zhen Zhu, Jiangsu (CN); Mi Wang, Jiangsu (CN); Yingying Wang, Jiangsu (CN); Qingan Huang, Jiangsu (CN)

(73) Assignee: Southeast University, Jiangsu (CN)

( * ) Notice: Subject to any disclaimer, the term of this patent is extended or adjusted under 35 U.S.C. 154(b) by 0 days.

(21) Appl. No.: 17/270,050

(22) PCT Filed: Apr. 26, 2020

(86) PCT No.: PCT/CN2020/086950
§ 371 (c)(1),
(2) Date: Feb. 22, 2021

(87) PCT Pub. No.: WO2021/169019
PCT Pub. Date: Sep. 2, 2021

(65) Prior Publication Data
US 2022/0113272 A1 Apr. 14, 2022

(30) Foreign Application Priority Data

Feb. 24, 2020 (CN) .......................... 202010112658.7

(51) Int. Cl.
*G01N 27/22* (2006.01)
*G01V 3/10* (2006.01)

(52) U.S. Cl.
CPC .............. *G01N 27/221* (2013.01); *G01V 3/10* (2013.01)

(58) Field of Classification Search
CPC .............................. G01N 27/221; G01V 3/10
(Continued)

(56) References Cited

U.S. PATENT DOCUMENTS

2013/0176038 A1* 7/2013 Wherritt ............ G01N 33/2829
324/675

FOREIGN PATENT DOCUMENTS

CN  203337513  12/2013
CN  104297298  1/2015
(Continued)

OTHER PUBLICATIONS

English translation for CN-106093146-A (Year: 2016).*
"International Search Report (Form PCT/ISA/210) of PCT/CN2020/086950," dated Nov. 18, 2020, pp. 1-8.

*Primary Examiner* — Douglas X Rodriguez
*Assistant Examiner* — Byung Ro Lee
(74) *Attorney, Agent, or Firm* — JCIP Global Inc.

(57) ABSTRACT

Disclosed a passive wireless sensor for detecting discrete droplets and bubbles. A first inductor channel and a second inductor channel are disposed opposite each other to form a capacitor channel, the first inductor channel is connected to the second inductor channel to form a resonant circuit. When a detection object passes through the detection channel, the permittivity between the first inductor channel and the second inductor channel changes and consequently a capacitance value of the capacitor channel changes, thus resulting in a change in resonant frequency of the resonant circuit. A readout device is used to read the resonant frequency of the resonant circuit and perform detection according to the resonant frequency to obtain information of a corresponding detection object.

10 Claims, 4 Drawing Sheets

(58) Field of Classification Search
USPC .......................................................... 702/65
See application file for complete search history.

(56) References Cited

FOREIGN PATENT DOCUMENTS

| | | | | |
|---|---|---|---|---|
| CN | 105156775 | 12/2015 | | |
| CN | 106093146 | 11/2016 | | |
| CN | 107699485 | 2/2018 | | |
| EP | 1788593 A2 * | 5/2007 | ......... | H01F 17/0006 |
| WO | 2018152296 | 8/2018 | | |

* cited by examiner

PASSIVE WIRELESS SENSOR FOR DETECTING DISCRETE DROPLETS AND BUBBLES

CROSS-REFERENCE TO RELATED APPLICATION

This application is a 371 of international application of PCT application serial no. PCT/CN2020/086950, filed on Apr. 26, 2020, which claims the priority benefit of China application no. 202010112658.7, filed on Feb. 24, 2020. The entirety of each of the above mentioned patent applications is hereby incorporated by reference herein and made a part of this specification.

BACKGROUND

Technical Field

The present invention relates to droplet or bubble detection, and in particular, to a passive wireless sensor for detecting discrete droplets and bubbles.

Description of Related Art

At present, as the application of micro-droplets becomes increasingly important, droplet or bubble detection has gradually attracted attention. The droplet detection is widely applied in droplet emulsification, mixing, embedding, extraction, biological identification, etc. However, it still lacks of a rapid and accurate solution of detecting parameters such as generation speed, flow rate, size, and quantity of droplets. In addition, the bubbles could cause instability in fluid, and would even affect the capture and culture of biological cells, tissues and organs in the microfluid channels. Therefore, the monitor of whether bubbles exist in a perfusion system is urgently required.

Up to now, the solutions for droplet or bubble detection include acoustic, optical, inductance and capacitance. However, there are several drawbacks to be addressed. The acoustic detection method is susceptible to conditions such as noise and vibration. Moreover, the optical detection method is susceptible to environmental factors such as temperature and oil permeability. Last but not least, both inductance and capacitance detection method require external power source to supply power to the circuit and need wires to connect circuit elements.

SUMMARY

Invention objective: The present invention aims to provide a passive wireless sensor for discrete droplet and bubble detection.

Technical solution: An embodiment of the present invention provides a passive wireless sensor for detecting discrete droplets and bubbles, including: a detection channel, a first inductor channel, a second inductor channel, and a readout device, where the first inductor channel and the second inductor channel are disposed opposite each other to form a capacitor channel, the first inductor channel is connected to the second inductor channel, liquid conductive material is injected into the first inductor channel and the second inductor channel, and the first inductor channel and the second inductor channel together form a resonant circuit;

the detection channel is disposed between the first inductor channel and the second inductor channel, where when a detection object passes through the detection channel, the permittivity between the first inductor channel and the second inductor channel changes. Consequently, the capacitance value of the capacitor channel changes, thus resulting in a change in resonant frequency of the resonant circuit, the detection object includes both of droplet and bubble;

the readout device is used to read the resonant frequency of the resonant circuit and perform detection of corresponding detection object according to the resonant frequency.

Specifically, the passive wireless sensor further includes a microfluidic chip substrate, where the detection channel, the first inductor channel, and the second inductor channel are formed by micro channels based on a polydimethylsiloxane (PDMS) material, and are integrated on the microfluidic chip substrate.

Specifically, the passive wireless sensor further includes an inductor inlet, through which the liquid conductive material is injected, and an inductor outlet. Both of the inductor inlet and inductor outlet are connected to the first inductor channel and the second inductor channel separately.

Specifically, the first inductor channel and the second inductor channel include inductance coil, which is formed by channels in a spiral shape.

Specifically, when the detection object is the bubble, the passive wireless sensor includes a bubble generation structure, which is integrated on the microfluidic chip substrate, along with a fluid inlet and a gas inlet, which meet at a junction connected to the detection channel.

Specifically, the readout device calculates the volume of the detection object by using the following formula when the detection object contacts the inner wall of the detection channel:

$$\Delta f_s = K_1 \cdot K_2 \cdot V_{droplet}$$

where $\Delta f_s$ denotes a variation value of the resonant frequency;

$$K_1 = \frac{L_S}{4\pi (L_S C_S)^{\frac{3}{2}}},$$

$L_s$ and $C_s$ being respectively an inductance value and a capacitance value of the resonant circuit; and $$K_2 = A \cdot \frac{\varepsilon_0 (\varepsilon_1 - \varepsilon_2)}{D \cdot V_{capacitor}},$$

with A and D respectively denoting a facing area and a distance between the first inductor channel and the second inductor channel; $V_{capacitor}$ denoting a volume contained between the first inductor channel and the second inductor channel; $\varepsilon_1$ denoting a relative permittivity of the detection object between the first inductor channel and the second inductor channel; $\varepsilon_2$ denoting a relative permittivity of a substance other than the detection object; and $\varepsilon_0$ denoting the vacuum permittivity.

Specifically, the readout device calculates the length of the detection object with reference to the size of the detection channel.

Specifically, the readout device calculates the volume of the detection object by using the following formula when the detection object does not contact the inner wall of the detection channel:

$$\Delta f_S = K_1 \cdot \frac{4\pi \cdot (\varepsilon_1 - \varepsilon_2) \cdot \varepsilon_0 \varepsilon_2}{D \cdot \varepsilon_1} \cdot \frac{r^3}{3D + 4r\left(\frac{\varepsilon_2}{\varepsilon_1} - 1\right)}$$

where $\Delta f_s$ denotes the variation value of the resonant frequency;

$$K_1 = \frac{L_S}{4\pi(L_S C_S)^{\frac{3}{2}}},$$

$L_s$ and $C_s$ respectively denotes the inductance value and the capacitance value of the resonant circuit;

and D denotes the distance between the first inductor channel and the second inductor channel; $\varepsilon_1$ denotes a relative permittivity of the detection object between the first inductor channel and the second inductor channel; $\varepsilon_2$ denotes a relative permittivity of a substance other than the detection object; $\varepsilon_0$ denotes the vacuum permittivity; r denotes the radius of the detection object; 2r denotes the length of the detection object, and $4/3 \cdot \pi r^3$ is the volume of the detection object.

Specifically, the readout device calculates the speed $S_{droplet}$ of the detection object by using the following formula:

$$S_{droplet} = \frac{L_{capacitor} + l_{droplet}}{\Delta t},$$

where $L_{capacitor}$ denotes the length of the capacitor channel, $l_{droplet}$ denotes the length of the detection object, and $\Delta t$ denotes the time for which the detection object passes through the capacitor channel.

Specifically, the readout device calculates the number of the detection objects according to the number of changes in the resonant frequency.

Advantageous Effect: Compared to the prior art, the present invention has the following significant advantages. The droplet or bubble detection can be realized according to the resonant frequency which is read in a non-contact mode with a passive circuit. Thus, the system could get rid of external and internal limitations, which greatly reduce the size of a detection device, causing no loss to the device, prolonging the service life of the device, ensuring the accuracy of a detection result, and expanding the applications of the detection device.

DESCRIPTION OF THE EMBODIMENTS

The technical solution of the present invention is further described below with reference to the accompanying drawings.

Figure 1:
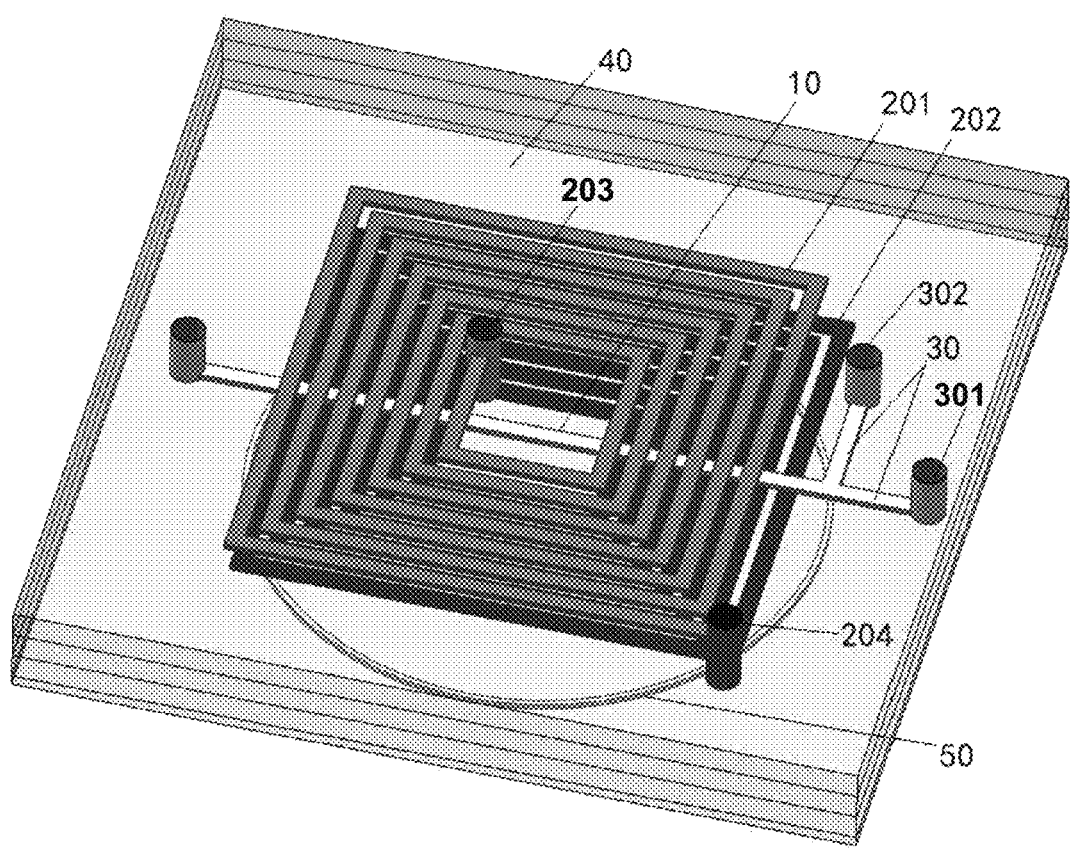
FIG. 1 is a schematic structural diagram of a passive wireless sensor for discrete droplet and bubble detection, which is provided in an embodiment of the present invention.
Figure 2:
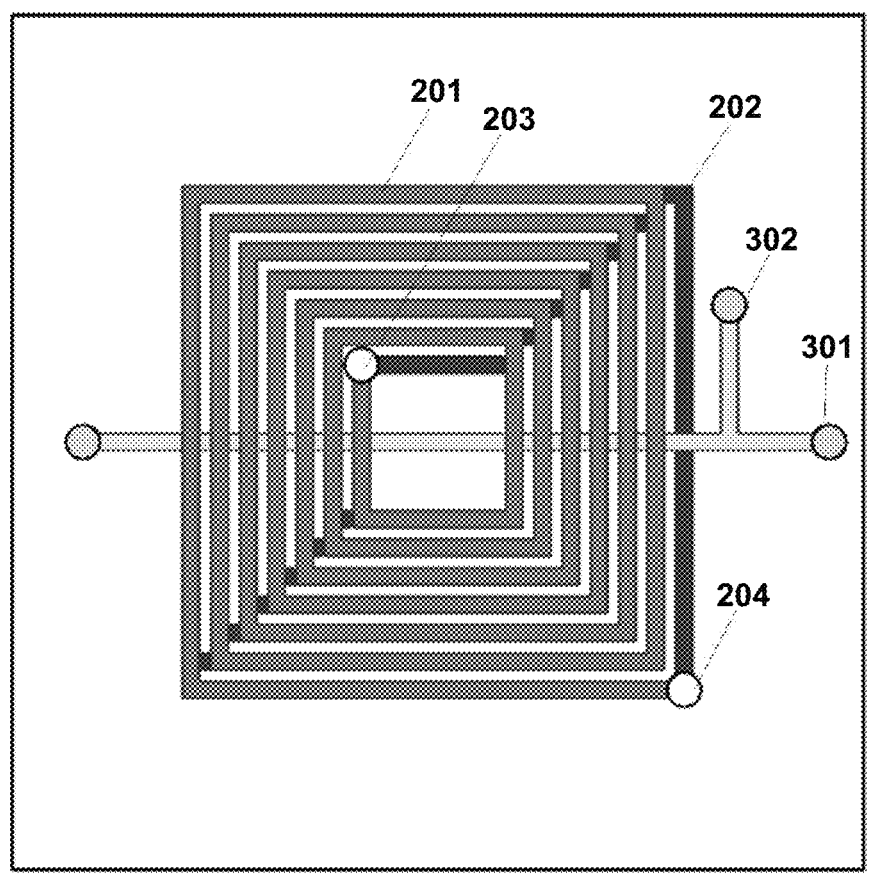
FIG. 2 is a top view of the passive wireless sensor for discrete droplet and bubble detection, which is provided in an embodiment of the present invention.

Refer to FIG. 1 and FIG. 2, which are respectively a schematic structural diagram of a passive wireless sensor for detecting discrete droplets and bubbles provided in an embodiment of the present invention and a top view of the passive wireless sensor for detecting discrete droplets and bubbles provided in an embodiment of the present invention.

The embodiment of the present invention provides a passive wireless sensor for detecting discrete droplets and bubbles, which includes a detection channel 10, a first inductor channel 201, a second inductor channel 202, and a readout device 50.

The first inductor channel 201 and the second inductor channel 202 are disposed opposite each other to form a capacitor channel, and the first inductor channel 201 is connected to the second inductor channel 202. A liquid conductive material is injected into the first inductor channel 201 and the second inductor channel 202, to form a resonant circuit.

The detection channel 10 is disposed between the first inductor channel 201 and the second inductor channel 202. When a detection object passes through the detection channel 10, the permittivity between the first inductor channel 201 and the second inductor channel 202 changes and consequently a capacitance value of the capacitor channel changes, thus resulting in a change in resonant frequency of the resonant circuit. The detection object includes either of a droplet and a bubble.

The readout device 50 is used to read the resonant frequency of the resonant circuit and perform detection according to the resonant frequency to obtain information of a corresponding detection object.

In a specific implementation, the first inductor channel 201 and the second inductor channel 202 are disposed opposite each other to form a capacitor channel. The first inductor channel 201 and the second inductor channel 202 are opposite to each other and linked together to form a connected path. Thus, the first inductor channel 201 and the second inductor channel 202 may be regarded as two capacitor plates, and integrally could be regarded as the capacitor channel. On the premise of regarding the first inductor channel 201 and the second inductor channel 202 integrally as the capacitor channel, the first inductor channel 201 and the second inductor channel 202 themselves are inductors. Thus, the whole connected path includes inductors and capacitor, which could form a resonant circuit with a resonant frequency.

In a specific implementation, the detection object including either of a droplet and a bubble refers to that the detection object of a detection device is either a droplet or a bubble. When the detection object passing through the detection channel 10 is the droplet, the readout device 50 performs detection according to the resonant frequency to obtain information of the droplet; when the detection object passing through the detection channel 10 is the bubble, the readout device 50 performs detection according to the resonant frequency to obtain information of the bubble. Two continuous fluids that are immiscible with each other converge in a micro channel to generate a stable, ordered, non-continuous flow, which are named droplets. In a specific implementation, the liquid conductive material is injected into the first inductor channel 201 and the second inductor channel 202 to form a passive resonant circuit, where the liquid conductive material could be liquid gallium-indium-tin alloy, conductive silver paste, PEDOT:PSS solution, etc. Compared to the capacitance detection method and the inductance detection method, of which the circuits require external power and electrical connections in former methods, the passive wireless resonant circuit can get rid of the limitations and greatly reduce the device size. Therefore, the present invention can be applied in a closed or harsh environment, such as closed mechanical structure or a rotating mechanical structure; Furthermore, the present invention is insusceptible to the external power source, thus improving the accuracy of detection.

In a specific implementation, when the droplet or bubble passes through the detection channel 10, that is, when the detection object passes between the first inductor channel 201 and the second inductor channel 202, the permittivity between the first inductor channel 201 and the second inductor channel 202 changes, namely, the permittivity of the capacitor channel changes. The change of permittivity results in a change in the capacitance value of the capacitor channel, which then brings an impact on the resonant circuit; and the resonant frequency of the resonant circuit changes accordingly.

In a specific implementation, compared to the acoustic detection method and the optical detection method which are susceptible to external factors and require operations such as marking and heating on the detection object, the present invention uses the change of permittivity of the capacitor channel caused by the passing droplet or bubble to between the first inductor channel 201 and the second inductor channel 202, to accomplish detection according to the resonant frequency of the resonant circuit, eliminating interference from the external factors, without additional processing for the detection object. Therefore, the present invention can ensure the accuracy of the detection result, realize loss-free and highly repeatable detection, and furtherly prolong the service life of the detection device.

In a specific implementation, the readout device 50 could be formed by a readout coil and a vector network analyzer, or a readout coil and an impedance spectroscope, or another device which is capable of reading the resonant frequency. The readout device 50 reads the resonant frequency and a variation value of the resonant frequency in a non-contact mode, eliminating the interference from the external factors and the limitations of a circuit connection line. Thus, the present invention realizes loss-free and highly repeatable detection, prolongs the service life of the passive wireless sensor for discrete droplet and bubble detection, expands the applications of the passive wireless sensor and ensures the accuracy of the detection result.

In a specific implementation, the readout device 50 could further include a function of calculation, which is used for data calculation of the obtained result.

In the embodiment of the present invention, the passive wireless sensor for detecting discrete droplets and bubbles further includes a microfluidic chip substrate 40. The detection channel 10, the first inductor channel 201, and the second inductor channel 202 are formed by micro channels based on a polydimethylsiloxane (PDMS) material, and are integrated on the microfluidic chip substrate 40.

In a specific implementation, the PDMS material belongs to organosilicon which can be used for manufacturing microfluidic chips; and the micro channel may refer to a channel.

In a specific implementation, the liquid conductive material is injected into the channels to form a passive resonant circuit, thus eliminating the limitations of the external power source and connection lines, and greatly reducing the size of the whole detection device. Therefore, the channels can be integrated on the microfluidic chip substrate 40 to form a microfluidic chip for droplet or bubble detection, improving portability.

In the embodiment of the present invention, the passive wireless sensor for detecting discrete droplets and bubbles further includes an inductor inlet 203 through which the liquid conductive material is injected, and an inductor outlet 204. The inductor inlet 203 is connected to the first inductor channel 201 and the second inductor channel 202 separately. The inductor outlet 204 is connected to the first inductor channel 201 and the second inductor channel 202 separately.

In a specific implementation, the liquid conductive material could be injected through the inductor inlet 203, filling the first inductor channel 201 and the second inductor channel 202, and flow out from the inductor outlet 204, to finally form a passive capacitor-inductor resonant circuit.

In a specific implementation, the inductor outlet 204 and the inductor inlet 203 are interchangeable, that is, an injection flow path of the liquid conductive material can be changed.

In the embodiment of the present invention, the first inductor channel 201 and the second inductor channel 202 include inductance coil, which is formed by channels in a spiral shape.

In a specific implementation, the inductance coil is a spiral channel in forms of a planar single layer or three-dimensional multiple layers. When the inductance coil is three-dimensional multiple layers, the channel spirals continuously from top to bottom or form bottom to top, and specifically, could spiral in various plane shapes such as a square, rectangle, ellipse, circle, etc., so as to form a multi-layer inductance coil. In a preferred manner, each half circle (or a quarter circle or a three-quarter circle) forms one layer. When the inductance coil is planar single layer, the channel coils also spiral in various plane shapes such as a square, rectangle, ellipse, circle, etc., as is shown in FIG. 2.

In the embodiment of the present invention, when the detection object is the bubble, the passive wireless sensor further includes a bubble generation structure 30 which is integrated on the microfluidic chip substrate 40 and includes a fluid inlet 301 and a gas inlet 302. The fluid inlet 301 and the gas inlet 302 meet at a junction which is connected to the detection channel 10.

In a specific implementation, after liquid is injected through the fluid inlet 301 and gas is injected in through the gas inlet 302, bubbles could subsequently be generated in the liquid at the junction, enter the detection channel 10, and then flow between the first inductor channel 201 and the second inductor channel 202. For example, as shown in FIG. 1, the bubble generation structure 30 is a T-junction structure, and the bubble size and production rate can be flexibly adjusted by adjusting conditions, such as the structural design, geometric dimensions, surface chemical properties, and fluid flow rate of the micro channel (the bubble generation structure 30). The bubble generation structure 30 could be self-set by the user which mainly includes the following three structural modes: T-junction, flow-focusing, and co-axial flow.

In a specific implementation, a stable, ordered, non-continuous flow, namely, droplets, are generated at a converging place of two continuous fluids that are immiscible with each other. When the detection object is the droplet, the passive wireless sensor for detecting discrete droplets and bubbles may include a droplet generation structure, and a droplet size and generation frequency can be flexibly adjusted by adjusting conditions, such as the structural design, geometric dimensions, surface chemical properties, and fluid flow rate, of the micro channel (the droplet generation structure). The droplet generation structure may be self-set by the user mainly to the following three structural modes: T-junction, flow-focusing, and co-axial flow.

Figure 3:
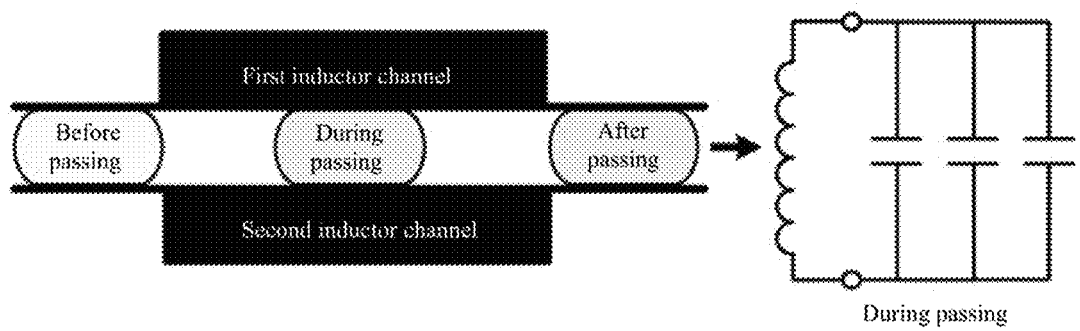
FIG. 3 is a schematic diagram of a detection object passing through a detection channel in an embodiment of the present invention.

Referring to FIG. 3, it is a schematic diagram of a detection object passing through the detection channel 10 in an embodiment of the present invention.

In the embodiment of the present invention, the readout device 50 calculates the volume of the detection object by using the following formula when the detection object contacts the inner wall of the detection channel 10:

$$\Delta f_s = K_1 \cdot K_2 \cdot V_{droplet},$$

where $\Delta f_s$ denotes a variation value (known) of the resonant frequency;

$$K_1 = \frac{L_S}{4\pi(L_S C_S)^{\frac{3}{2}}},$$

where $L_s$ and $C_s$ respectively denote an inductance value (which is known and corresponding to the first inductor channel 201 and the second inductor channel 202) and capacitance value (which is known and corresponding to the capacitor channel) of the resonant circuit; and $$K_2 = A \cdot \frac{\varepsilon_0(\varepsilon_1 - \varepsilon_2)}{D \cdot V_{capacitor}},$$

where A and D respectively denote a facing area (known) and a distance (known) between the first inductor channel 201 and the second inductor channel 202; $V_{capacitor}$ or denotes a volume (known) contained between the first inductor channel 201 and the second inductor channel 202; $\varepsilon_1$ denotes a relative permittivity (known) of the detection object between the first inductor channel 201 and the second inductor channel 202; $\varepsilon_2$ denotes a relative permittivity (known) of a substance (for example, a filling liquid in the detection channel 10) other than the detection object; and $\varepsilon_0$ denotes the vacuum permittivity.

In the embodiment of the present invention, the readout device 50 calculates the length of the detection object with reference to the size of the detection channel 10.

In a specific implementation, $\varepsilon_1$ and $\varepsilon_2$ may respectively denote a relative permittivity (known) of the droplet or bubble between the first inductor channel 201 and the second inductor channel 202 in the detection channel 10 and a relative permittivity of a substance (for example, the filling liquid in the detection channel 10) other than the droplet or bubble.

In a specific implementation, $$\Delta f_s = -\frac{1}{4\pi(L_S C_S)^{\frac{3}{2}}}(C_S \cdot \Delta L_S + L_S \cdot \Delta C_S),$$

where $\Delta L_s$ and $\Delta C_s$ respectively denote a change of inductance value and a change of capacitance value of the resonant circuit; and when the droplet or bubble passes through the capacitor channel, $\Delta L_s \approx 0$, to obtain $$\Delta f_s = -\frac{L_S}{4\pi(L_S C_S)^{\frac{3}{2}}} \cdot \Delta C_S.$$

Further, a differential expression formula of the changing capacitance value is as follows:

$$\Delta C_S = \frac{\varepsilon_0 \varepsilon_r}{D} \cdot \Delta A + A\frac{\varepsilon_0}{D} \cdot \Delta \varepsilon_r - A\frac{\varepsilon_0 \varepsilon_r}{D^2} \cdot \Delta D,$$

where $\Delta A$ denotes a change of facing area (which may be approximately equal to 0) between the first inductor channel 201 and the second inductor channel 202, and $\Delta D$ denotes a change of distance (which may be approximately equal to 0) between the first inductor channel 201 and the second inductor channel 202, and $\varepsilon_r$ denotes a relative permittivity of a medium between the first inductor channel 201 and the second inductor channel 202. The following result can be obtained:

$$\Delta C_S = A\frac{\varepsilon_0}{D} \cdot \Delta \varepsilon_r,$$

where $\varepsilon_{r1} = \frac{V_{droplet}}{V_{capacitor}}\varepsilon_1 + \left(1 - \frac{V_{droplet}}{V_{capacitor}}\right)\varepsilon_2,$ which denotes an equivalent relative permittivity of the medium between the first inductor channel 201 and the second inductor channel 202 when the droplet passes between the first inductor channel 201 and the second inductor channel 202; and $$\Delta \varepsilon_r = \varepsilon_{r1} - \varepsilon_2 = \frac{V_{droplet}}{V_{capacitor}}(\varepsilon_1 - \varepsilon_2).$$

Therefore, based on the formula: $\Delta f_s = K_1 \cdot K_2 \cdot V_{droplet}$, the volume $V_{droplet}$ of the droplet or bubble (namely, each drop of the droplets or each bubble) can be obtained.

In a specific implementation, when the droplet or bubble contacts the inner wall of the detection channel 10 and entirely occupies the inner diameter of the detection channel 10, namely, in a status shown in FIG. 3, the droplet or bubble could be regarded as a cylinder, cuboid, or cube. After the volume of the droplet or bubble is obtained, the length of the detection object, namely, the height of the cylindrical droplet or bubble, can be calculated with reference to the size (the inner diameter) of the detection channel 10.

In the embodiment of the present invention, the readout device 50 calculates the volume of the detection object by using the following formula when the detection object does not contact the inner wall of the detection channel 10:

$$\Delta f_s = K_1 \cdot \frac{4\pi(\varepsilon_1 - \varepsilon_2) \cdot \varepsilon_0 \varepsilon_2}{D \cdot \varepsilon_1} \cdot \frac{r^3}{3D + 4r\left(\frac{\varepsilon_2}{\varepsilon_1} - 1\right)},$$

where $\Delta f_s$ denotes a variation value (known) of the resonant frequency;

$$K_1 = \frac{L_S}{4\pi(L_S C_S)^{\frac{3}{2}}},$$

where $L_s$ and $C_s$ are respectively an inductance value (known) and a capacitance value (known) of the resonant circuit; and D denotes a distance (known) between the first inductor channel 201 and the second inductor channel 202; $\varepsilon_1$ denotes a relative permittivity (known) of the detection object between the first inductor channel 201 and the second inductor channel 202, and $\varepsilon_2$ denotes a relative permittivity of a substance (known) other than the detection object; $\varepsilon_0$ denotes the vacuum permittivity; r denotes the radius of the detection object; 2r denotes the length of the detection object, and $4/3 \cdot \pi r^3$ is the volume of the detection object.

Figure 4:
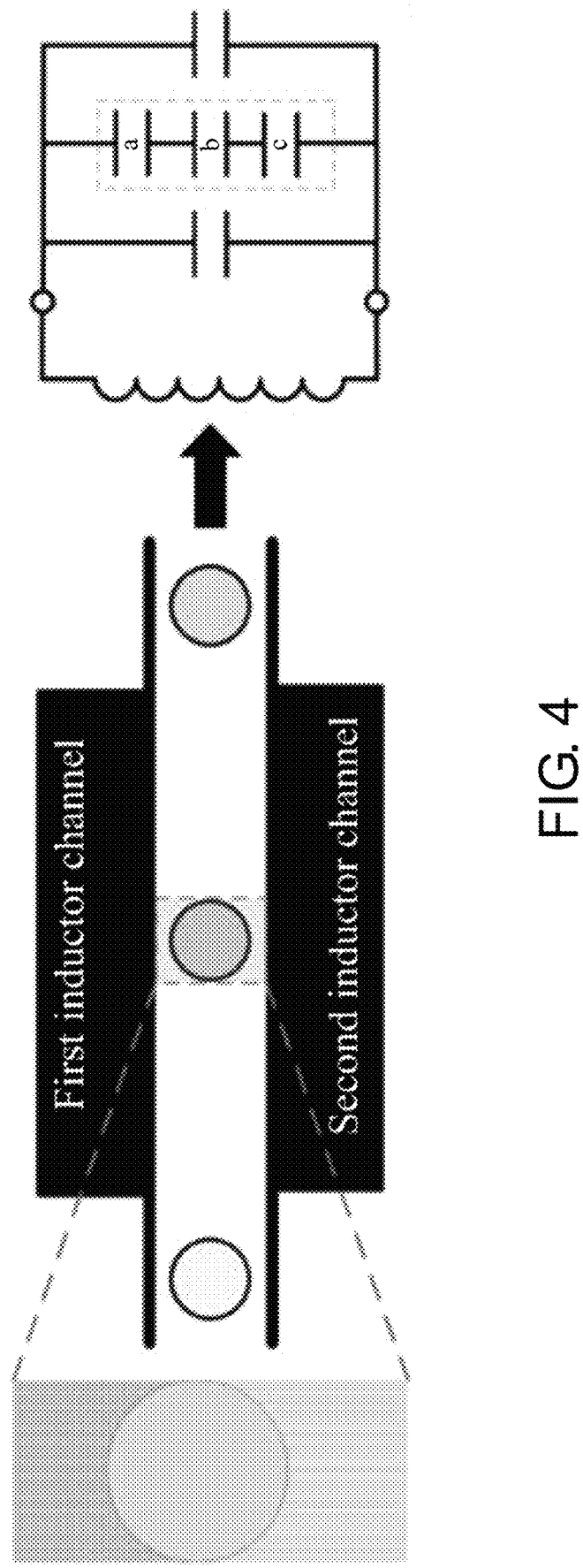
FIG. 4 shows another schematic diagram of a detection object passing through a detection channel, and a circuit equivalent diagram in an embodiment of the present invention.
Figure 5:
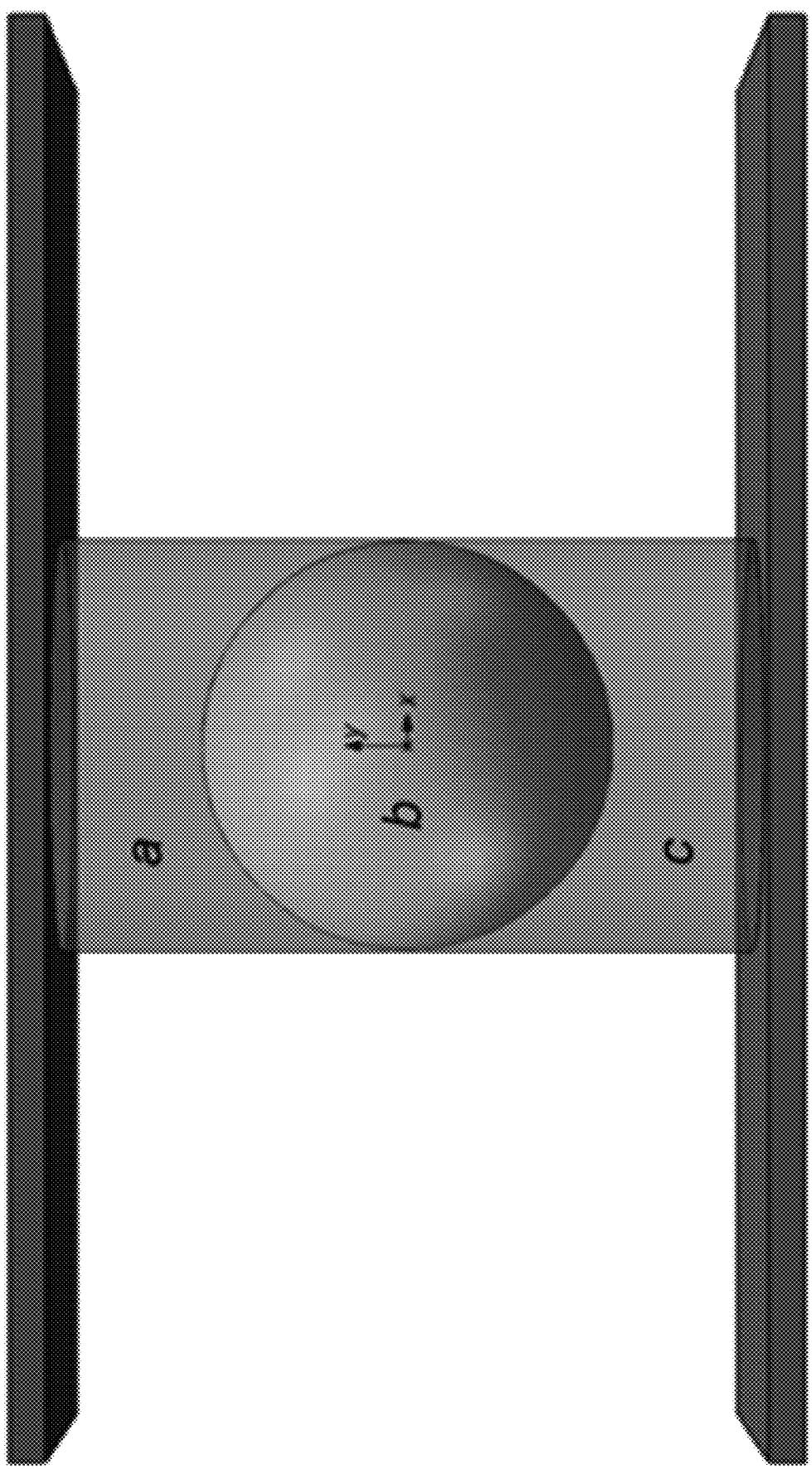
FIG. 5 is a schematic diagram of a droplet or bubble corresponding to FIG. 4.

Referring to FIG. 4 and FIG. 5, FIG. 4 is another schematic diagram of embodiment of the present invention, in which the detection object passes through the detection channel 10; and FIG. 5 is a schematic diagram of a droplet or bubble corresponding to FIG. 4.

In a specific implementation, when the generated droplet or bubble is relatively small, the detection object does not contact the inner wall of the detection channel 10 when passing between the capacitor channel, as shown in FIG. 4 and FIG. 5. A study model of the droplet or bubble is simplified to a cross section $A_1 = \pi r^2$ (r is the radius of the approximately spherical droplet or bubble) and a vertical cylindrical medium region that directly extends from the first inductor channel 201 to the second inductor channel 202, with a height equal to the distance D between the first inductor channel 201 and the second inductor channel 202 (with a volume of $V_1 = A_1 D = \pi r^2 D$) as shown in FIG. 5; and the capacitance value changes only within the cylindrical medium region.

When the droplet or bubble has not passed between the first inductor channel 201 and the second inductor channel 202, the medium (the filling liquid in the detection channel 10) in the study model is completely in a continuous phase and has a relative permittivity of $\varepsilon_2$. $\varepsilon_0 = 8.85 \times 10^{-12}$ (F/m), which is the vacuum permittivity. In this case, a combined capacitance in the medium area of the study model is:

$$C_2^* = \frac{\varepsilon_0 \varepsilon_2 A_1}{D}.$$

When the droplet or bubble passes between the first inductor channel 201 and the second inductor channel 202, except the continuous-phase medium, the study model also contains dispersed near-spherical droplets or bubbles. In this case, a combined capacitance in the medium area of the study model is:

$$C_2 = \frac{1}{\frac{1}{C_a} + \frac{1}{C_b} + \frac{1}{C_c}}.$$

As shown in FIG. 5, $C_a$ is a capacitance value of the medium area between one side of the inner wall and the droplet or bubble, $C_b$ is a capacitance value of the droplet or bubble, and $C_c$ is a capacitance value of the medium area between the other side of the inner wall and the droplet or bubble.

The capacitances are calculated separately by means of a differential method:

Calculation of $C_a$: The medium area with this capacitance value is equidistantly differentiated into several parts in x, y and z directions. Capacitors with the same facing area $A_k$ and the same distance $d_k$ in y direction are connected in series. A sum of the capacitances thereof is:

$$C_{ak} = \frac{1}{\sum \frac{1}{\frac{\varepsilon_0 \varepsilon_2 A_k}{d_k}}} = \frac{\varepsilon_0 \varepsilon_2 A_k}{\sum d_k}$$

In adjacent medium areas on the same xoz plane, capacitors are connected in parallel and a sum of the capacitances thereof may be calculated as follows:

$$C_a = \sum_{xoz} C_{ak} = \frac{\varepsilon_0 \varepsilon_2 A_1}{d_a} = \frac{D \cdot A_1}{d_a \cdot A_1} \cdot C_2^* = \frac{V_1}{V_a} \cdot C_2^*$$

where $V_a = \sum A_k d_i = d_a \cdot A_1$, and $C_b = \frac{V_1}{V_{droplet}} \cdot \frac{\varepsilon_1}{\varepsilon_2} \cdot C_2^*$, $C_c = \frac{V_1}{V_c} \cdot C_2^*$ can be obtained in the same way; and further, $V_a + V_{droplet} + V_c = V_a + 4/3 \cdot \pi r^3 + V_c$.

Then:

$$\Delta C_S = \Delta C_2 = C_2 - C_2^* =$$

$$\left( \frac{V_1}{V_a + \frac{\varepsilon_2}{\varepsilon_1} \cdot V_{droplet} + V_c} - 1 \right) C_2^* = \left( \frac{1}{1 + \frac{4 \cdot (\varepsilon_2 - \varepsilon_1) \cdot r}{3 \cdot \varepsilon_1 \cdot D}} - 1 \right) \cdot \frac{\varepsilon_0 \varepsilon_2 \pi r^2}{D} =$$

$$\frac{4\pi \cdot (\varepsilon_1 - \varepsilon_2) \cdot \varepsilon_0 \varepsilon_2}{D \cdot \varepsilon_1} \cdot \frac{r^3}{3D + 4r\left(\frac{\varepsilon_2}{\varepsilon_1} - 1\right)}$$

(By taking the two phases of oil and water as an example: water as the dispersed phase and oil as the continuous phase, then:

$$\frac{\varepsilon_2}{\varepsilon_1} \approx 0).$$

Finally:

$$\Delta f_s = K_1 \cdot \frac{4\pi \cdot (\varepsilon_1 - \varepsilon_2) \cdot \varepsilon_0 \varepsilon_2}{D \cdot \varepsilon_1} \cdot \frac{r^3}{3D + 4r\left(\frac{\varepsilon_2}{\varepsilon_1} - 1\right)}.$$

A relationship between the variation value of the resonant frequency and the radius r of the spherical droplet or bubble is obtained; and then the length 2r and the volume $4/3 \cdot \pi r^3$ of the droplet or bubble can be obtained with calculation.

In the embodiment of the present invention, the readout device 50 calculates the number of the droplets or bubbles according to the number of changes in the resonant frequency.

In a specific implementation, each time the detection object passes between the first inductor channel 201 and the second inductor channel 202, the capacitance value of the capacitor channel changes, and then the resonant frequency of the resonant circuit changes accordingly. Therefore, each time the resonant frequency has a change, it indicates that the detection object passes between the first inductor channel 201 and the second inductor channel 202, and thus the number of changes in the resonant frequency indicates the number of the droplets or bubbles. In some actual application scenarios, the number of the droplets or bubbles may be calculated by multiplying the number of changes in the resonant frequency by a preset weighting coefficient.

In the embodiment of the present invention, the readout device 50 calculates the speed $S_{droplet}$ of the droplet or bubble by using the following formula:

$$S_{droplet} = \frac{L_{capacitor} + l_{droplet}}{\Delta t},$$

where $L_{capacitor}$ denotes the length of the first inductor channel 201 or the second inductor channel 202, $l_{droplet}$ denotes the length of the droplet or bubble, and $\Delta t$ denotes the time for which the droplet or bubble passes between the first inductor channel 201 and the second inductor channel 202.

In a specific implementation, $L_{capacitor}$ denotes the length of the first inductor channel 201 or the second inductor channel 202 within the range of the detection channel 10, namely, the length by which the detection object passes in the detection channel 10 from entry to exit between the first inductor channel 201 and the second inductor channel 202.

What is claimed is:

1. A passive wireless sensor for detecting discrete droplets and bubbles, comprising: a detection channel, a first inductor channel, a second inductor channel, and a readout device, wherein:
    the first inductor channel and the second inductor channel are disposed opposite each other to form a capacitor channel, the first inductor channel is connected to the second inductor channel, and a liquid conductive material is injected into the first inductor channel and the second inductor channel, to form a resonant circuit;
    the detection channel is disposed between the first inductor channel and the second inductor channel, wherein when a detection object passes through the detection channel, the permittivity between the first inductor channel and the second inductor channel changes and consequently a capacitance value of the capacitor channel changes, thus resulting in a change in resonant frequency of the resonant circuit; and the detection object comprises either of a droplet and a bubble; and
    the readout device is used to read the resonant frequency of the resonant circuit and obtain information of the corresponding detection object according to the detected resonant frequency,
    wherein the readout device calculates the number of the detection objects according to the number of changes in the resonant frequency.

2. The passive wireless sensor for detecting discrete droplets and bubbles according to claim 1, further comprising: a microfluidic chip substrate, wherein the detection channel, the first inductor channel, and the second inductor channel are formed by microchannels based on a polydimethylsiloxane (PDMS) material, and are integrated on the microfluidic chip substrate.

3. The passive wireless sensor for detecting discrete droplets and bubbles according to claim 1, further comprising: an inductor inlet through which the liquid conductive material is injected, and an inductor outlet, wherein the inductor inlet is connected to the first inductor channel and the second inductor channel separately, and the inductor outlet is also connected to the first inductor channel and the second inductor channel separately.

4. The passive wireless sensor for detecting discrete droplets and bubbles according to claim 3, wherein the first inductor channel and the second inductor channel include an inductance coil, which is formed by channels in a spiral shape.

5. The passive wireless sensor for detecting discrete droplets and bubbles according to claim 2, wherein when the detection object is the bubble, the passive wireless sensor further comprises a bubble generation structure which is integrated on the microfluidic chip substrate and comprises a fluid inlet and a gas inlet; and the fluid inlet and the gas inlet meet at a junction which is connected to the detection channel.

6. The passive wireless sensor for detecting discrete droplets and bubbles according to claim 1, wherein the readout device calculates the volume of the detection object by using the following formula when the detection object contacts the inner wall of the detection channel:

$$\Delta f_s = K_1 \cdot K_2 \cdot V_{droplet},$$

wherein $\Delta f_s$ denotes a variation value of the resonant frequency;

$$K_1 = \frac{L_s}{4\pi(L_s C_s)^{\frac{3}{2}}},$$

$L_s$ and $C_s$ being respectively an inductance value and a capacitance value of the resonant circuit; and $$K_2 = A \cdot \frac{\varepsilon_0(\varepsilon_1 - \varepsilon_2)}{D \cdot V_{capacitor}},$$

A and D respectively denoting a facing area and a distance between the first inductor channel and the second inductor channel; $V_{capacitor}$ denoting a volume contained between the first inductor channel and the second inductor channel; $\varepsilon_1$ denoting a relative permittivity of the detection object between the first inductor channel and the second inductor channel; $\varepsilon_2$ denoting a relative permittivity of a substance other than the detection object; and $\varepsilon_0$ denoting the vacuum permittivity.

7. The passive wireless sensor for detecting discrete droplets and bubbles according to claim 6, wherein the readout device calculates the length of the detection object with reference to the size of the detection channel.

8. The passive wireless sensor for detecting discrete droplets and bubbles according to claim 1, wherein the readout device calculates the volume of the detection object by using the following formula when the detection object does not contact the inner wall of the detection channel:

$$\Delta f_s = K_1 \cdot \frac{4\pi \cdot (\varepsilon_1 - \varepsilon_2) \cdot \varepsilon_0 \varepsilon_2}{D \cdot \varepsilon_1} \cdot \frac{r^3}{3D + 4r\left(\frac{\varepsilon_2}{\varepsilon_1} - 1\right)},$$

wherein $\Delta f_s$ denotes a variation value of the resonant frequency;

$$K_1 = \frac{L_s}{4\pi(L_s C_s)^{\frac{3}{2}}},$$

$L_s$ and $C_s$ being respectively an inductance value and a capacitance value of the resonant circuit; and D denotes a distance between the first inductor channel and the second inductor channel; $\varepsilon_1$ denotes a relative permittivity of the detection object between the first inductor channel and the second inductor channel; $\varepsilon_2$ denotes a relative permittivity of a substance other than the detection object; $\varepsilon_0$ denotes the vacuum permittivity; r denotes the radius of the detection object; 2r denotes the length of the detection object, and $4/3 \cdot \pi r^3$ is the volume of the detection object.

9. The passive wireless sensor for detecting discrete droplets and bubbles according to claim 7, wherein the readout device calculates the speed $S_{droplet}$ of the detection object by using the following formula:

$$S_{droplet} = \frac{L_{capacitor} + l_{droplet}}{\Delta t},$$

wherein $L_{capacitor}$ denotes the length of the capacitor channel, $l_{droplet}$ denotes the length of the detection object, and $\Delta t$ denotes the time for which the detection object passes through the capacitor channel.

10. The passive wireless sensor for detecting discrete droplets and bubbles according to claim 8, wherein the readout device calculates the speed $S_{droplet}$ of the detection object by using the following formula:

$$S_{droplet} = \frac{L_{capacitor} + l_{droplet}}{\Delta t},$$

wherein $L_{capacitor}$ denotes the length of the capacitor channel, $l_{droplet}$ denotes the length of the detection object, and $\Delta t$ denotes the time for which the detection object passes through the capacitor channel.

* * * * *